Figure 4:
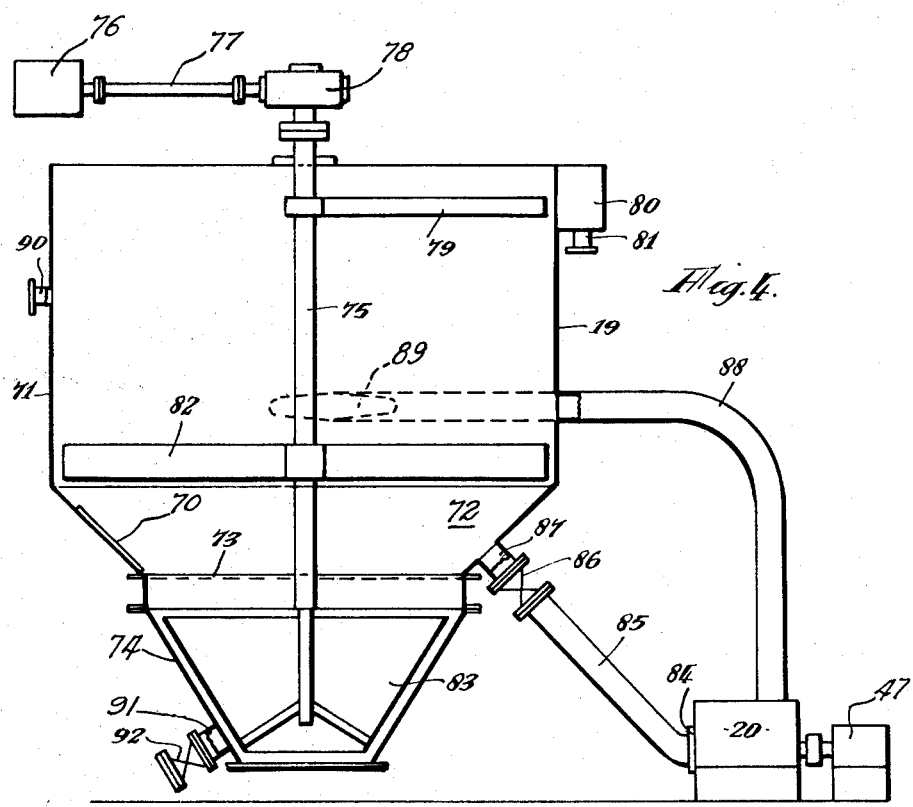

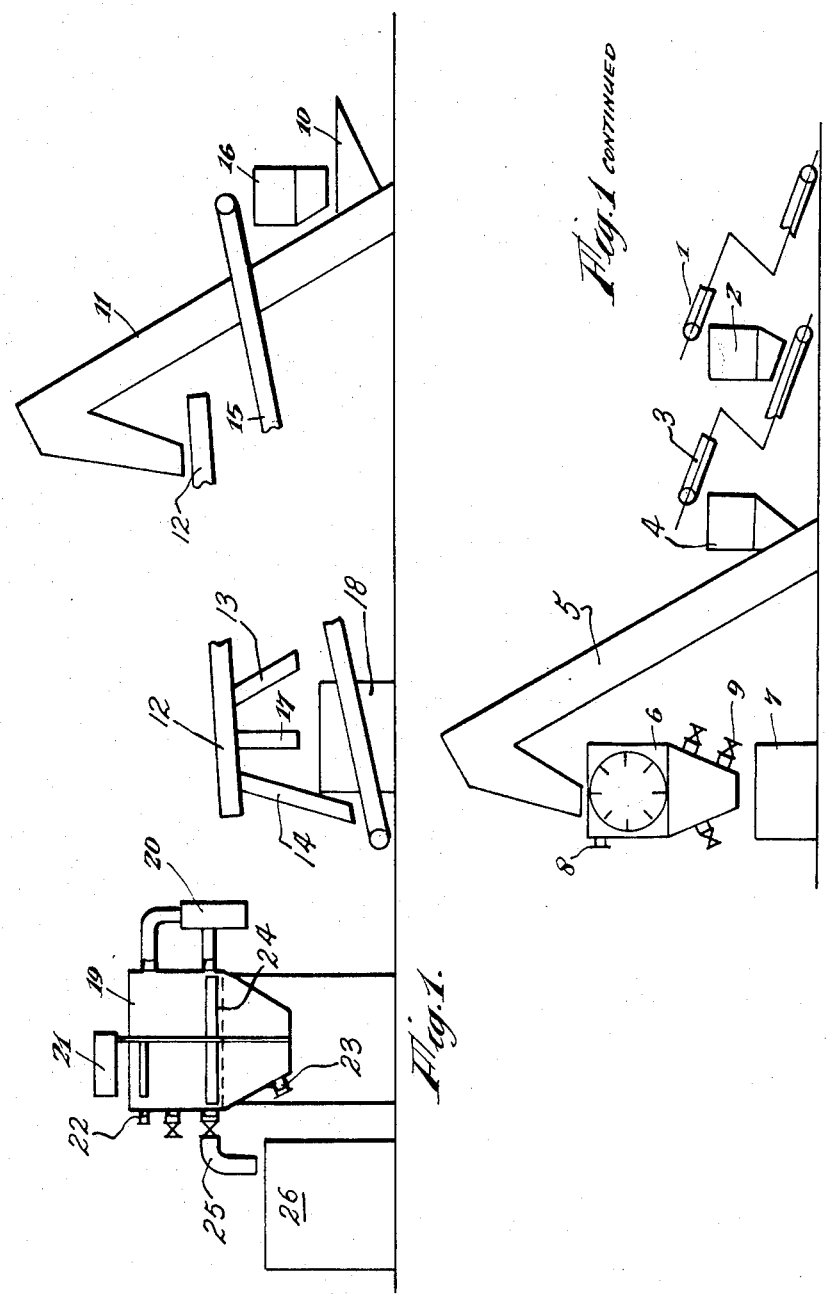

April 30, 1963   C. R. SCHELLENBERG   3,087,945
PROCESS FOR CLEANING AND DEGREASING BONES
Filed Nov. 26, 1958   4 Sheets-Sheet 2
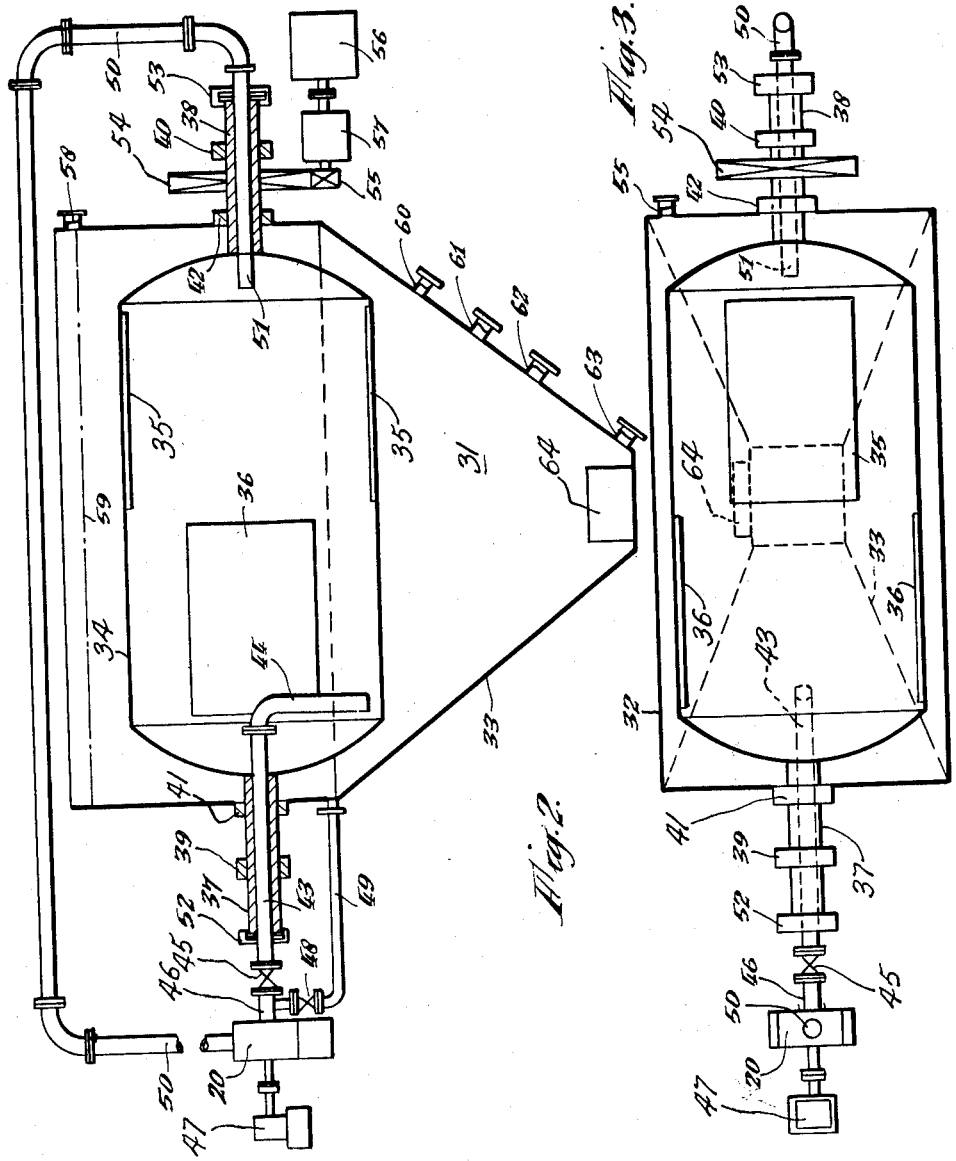

April 30, 1963 C. R. SCHELLENBERG 3,087,945
PROCESS FOR CLEANING AND DEGREASING BONES
Filed Nov. 26, 1958 4 Sheets-Sheet 3

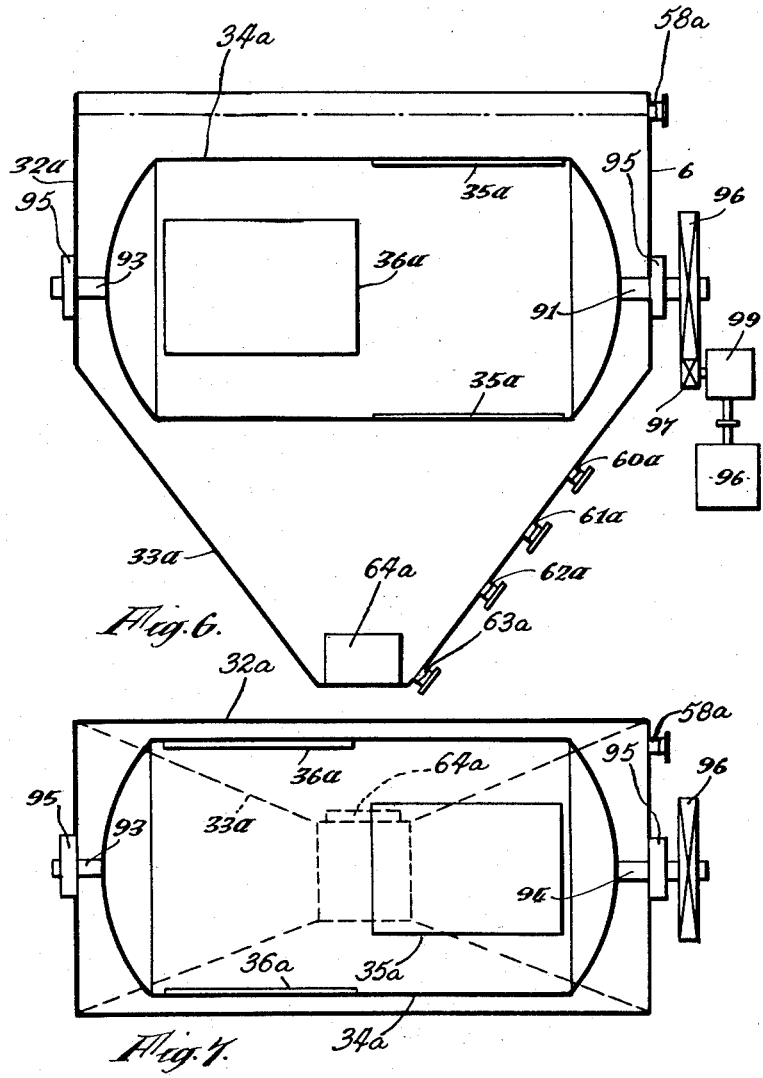

United States Patent Office 3,087,945
Patented Apr. 30, 1963

3,087,945
PROCESS FOR CLEANING AND DEGREASING BONES
Clifford Robertshaw Schellenberg, Nunthorpe, England, assignor to Cleveland Product Company Limited, Middlesbrough, England, a company of Great Britain and Northern Ireland
Filed Nov. 26, 1958, Ser. No. 776,459
Claims priority, application Great Britain Nov. 28, 1957
17 Claims. (Cl. 260—412.6)

This invention relates to the cleaning and degreasing of bones for use in the production of ossein gelatine.

Butchers' bones contain a high proportion of fat and have adhering meat tissue and sinew, all of which have to be removed, and none of the known methods of cleaning and degreasing raw bones renders them satisfactory for use in the production of ossein gelatine by the usual dephosphatising, liming and washing process. For this reason it has been usual to employ relatively costly bones imported from a country with a hot climate, such as India, where exposure to sun, rain and other local conditions affords a bone which is effectively cleaned of meat and sinew and has a fat content reduced to about 1% by weight.

The known wet-rendering process, wherein raw bones are subjected to the action of boiling water, or digested with hot water and steam under pressure, for a period of 5–10 hours has a deleterious effect on the bones, which tend to become mushy in the course of the subsequent treatments for the production of gelatine, so that a large proportion of the gelatine is lost, and that produced is of inferior quality.

The size of clean bone fragments used is of great importance in the manufacture of ossein gelatine, the optimum size range being between about ⅜" and ¾". Bone fragments of less than ¼" are difficult if not impossible to use in the methods which are principally and most economically used in the manufacture of ossein gelatine. Thus, proposals which have been made for the cleaning of bones in water-flooded apparatus, which causes their substantial disintegration, afford cleaned bone which may be useful in the manufacture of glue, but which consists of or contains far too high a proportion of fine fragments to be economically useful for the production of gelatine. The grease content is also higher than that obtainable by the process afforded by the present invention and permissible in the manufacture of high grade gelatine.

An object of the invention is to provide a method of producing from raw butchers' bones, which are largely contaminated with meat and sinew, and have a fat content of the order of 16%, cleaned and degreased bones of suitable size, preferably not exceeding ¾" and with a minimum proportion less than ¼" in size, and having a residual fat content of the order of 1% or less by weight.

The invention accordingly provides a method of producing cleaned and degreased bone fragments suitable for the production of ossein gelatine, after preliminary fragmentation to a size range not exceeding about ¾" and not less than about ¼", substantial cleaning from adhering meat and sinew, and reduction of the initial fat content of about 16% to about 5–6%, characterised in that such substantially cleaned and partly degreased bone fragments are circulated in a closed circuit with a flow of hot water maintained at a temperature of about 140°–190° F., preferably not exceeding 170° F. from, into and through a large body of said hot water wherein fat is separated by a flotation and particles of residual meat and sinew are separated by precipitation from the cleaned and degreased bone fragments.

Said body of water or the lower part thereof may be more or less mildly agitated and subjected to straining so as to facilitate the separation of the meat and sinew particles and any small proportion of fine bone fragments that may be present.

Preferably, the aforesaid final cleaning and degreasing method is applied for a period of the order of 30 minutes, and such has been found to effect a thorough cleaning of the bones and reduction of the fat content to the permissible 1% or less.

The rate of circulation may be such that the entire volume of water is circulated in 1½ minutes. For example, the volume of said body of water may be 1500 gallons sufficient to contain a batch of partly cleaned degreased bones of a weight of about 2 tons, and the circulation may be at the rate of 1000 gallons per minute.

The method as aforesaid may also be used as a speedy and most economical method for preparing air dried bones or bones of a like nature which have a grease content of between 2 and 6%, in which state they are unsuitable for producing high grade gelatine. The resultant bone, after treatment according to the method of the invention, is excellent for manufacturing high grade gelatine being cleaned and having a grease content below 1%.

Preferably, the aforesaid preliminary cleaning and degreasing may be effected by confining partly crushed raw bones within the middle of a volume of hot water at a temperature of about 140–190° F., preferably not higher than 170° F., and swirling or agitating the bones in the water for a few hours until the greater part of the meat and sinew has been softened and riddled off, and the fat content substantially reduced, for example, from an initial 16% by weight to about 5–6%, the meat and sinew particles together with any small bone particles being separated by settling, and the freed fat being separated by flotation.

To attempt a reduction of the bone to fragments having a maximum size of ¾" in a preliminary crushing would in their contaminated and greasy state result in the undesirable production of an uneconomic proportion of undersized fragments. The raw bones may therefore be roughly crushed, for example, successively in two jaw crushers or other apparatus suitable for crushing bone, the first having a coarse setting and the second having a medium setting. The resultant crushed consequently includes a considerable proportion of oversize bone fragments and of lumps consisting of bone fragments held together by meat and sinew. This may be treated by said preliminary cleaning and degreasing, thereafter being screened to separate any oversize material which in its cleaner and less greasy state can be subjected or returned to a crushing stage, and therein further reduced to fragments of a size range ¾–¼". This mode of operation has the advantage of minimising waste of bone and thereby enhancing the quantity available for gelatine manufacture, by avoiding excessive production of fine fragments or particles of bone which are suitable only for use in meat and bone meal.

The invention also provides apparatus for the cleaning and degreasing of bone fragments to render them suitable for the production of ossein gelatine, comprising a vessel for containing bone fragments reduced to a size range mainly of the order of ¾"–¼" and having a residual fat content of up to about 6%, means for maintaining a body of water in the vessel at a temperature of about 140–190° F., preferably not exceeding 170° F., means for continuously circulating water and said bone fragments suspended therein from and back into and through said body of water, means for the discharge of fat separated by flotation, straining means permitting the settlement in the vessel of residual meat and sinew particles and fine bone particles when present, means for the discharge of a slurry of said settled particles, means for the discharge of the water on completion of the cleaning and degreasing, and means enabling after discharge of said water and slurry, removal of the cleaned and degreased bone fragments.

In one embodiment of such apparatus, the vessel may include an apertured drum for confining the bone fragments, said drum being rotatable or oscillatable through a large angle, preferably about a horizontal axis, the circulation means serving for circulating the water and suspended bones through said drum. The circulating means may draw water and bones suspended therein from adjacent one end of the interior of said drum and return said water and bones into the other end of the drum. Further, in such embodiment, the apertured drum itself may serve as the sole agitating means for the water and bones.

In an alternative embodiment, the vessel may have a downwardly tapered lower portion, a fixed, horizontal, apertured partition separating said lower portion from an upper portion to confine the bone fragments to said upper portion, and rotary or oscillatory agitator means adjacent said perforated plate, the circulating means serving to circulate the water and bone fragments suspended therein from above said apertured partition and tangentially back to a higher level of said upper portion of the vessel.

The circulating means in either of the aforesaid embodiments may comprise a pump the intake and delivery ports of which are connected to the vessel by ducts external to the vessel.

In the first recited embodiment, the intake and delivery ports of said pump may be connected to the interior of the drum by way of hollow trunnions whereon said drum is rotatable or oscillatable.

The invention further provides apparatus comprising final cleaning and degreasing means as aforesaid, in combination with a preliminary cleaning and degreasing vessel including an apertured drum adapted to receive roughly crushed raw bones and mounted for rotation or oscillation through a large angle, preferably about a horizontal axis, means for maintaining water in the vessel at a temperature of about 140–190° F., preferably not exceeding 170° F., means for the discharge of fat separated by flotation, means for the discharge of meat and sinew particles and fine bone particles settled in the bottom of the vessel after passage through the apertures in said drum, means for the discharge of water from the vessel after discharge of said particles, means in said drum enabling the dumping of bone fragments from the drum after said discharges, and means at the bottom of said vessel enabling the withdrawal of partially cleaned and degreased fragments therefrom.

Figure 5:
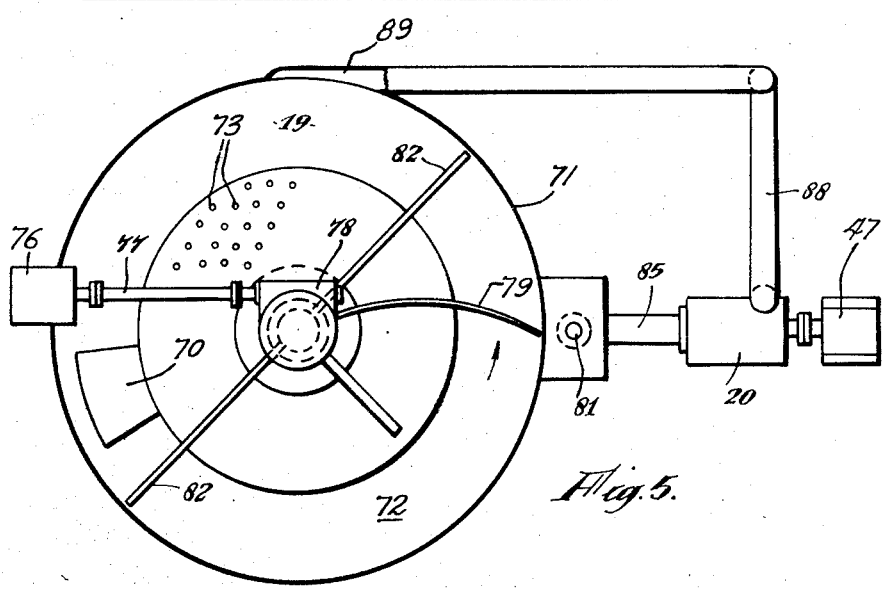

In order that the invention may be better understood, various embodiments of apparatus and their method of operation will be described with reference to the accompanying drawings, wherein:

FIGURE 1 is a flow diagram,

FIGURES 2 and 3 are diagrammatic sectional elevation and plan views respectively of a final cleaning and degreasing apparatus, FIGURES 4 and 5 are similar views of an alternative final cleaning and degreasing apparatus, and FIGURES 6 and 7 are similar views of a preliminary cleaning and degreasing apparatus.

Referring first to FIGURE 1, which illustrates diagrammatically the complete method of cleaning and degreasing raw bones according to the invention, said raw bones are first fed by a conveyor 1 to a first-stage crusher 2, and thence by a conveyor 3 to a second stage crusher 4 at the foot of an elevator 5 by which the crushed bones are fed to a preliminary cleaning and degreasing vessel 6.

The roughly crushed bones as supplied to the vessel 6 have a fat content of about 16%, and include oversized fragments and lumps of fragments as aforesaid. By the treatment in the vessel 6, which will later be described in more detail, the greater part of the meat and sinew is removed from the bones and at the same time a large proportion of the fat is freed, so that the bones are substantially cleaned and their fat content is reduced to about 5–6%. In this condition the bones are transferred to a receptacle 7. The fat separated by flotation is discharged at an outlet 8, while a slurry of meat and bone meal is discharged by way of a valve 9, both prior to the discharge of the bones into the receptacle 7.

From the receptacle 7 the partly cleaned and degreased bones are conveyed by any suitable means, such as mechanical, mobile shovels, to a freed hopper 10 of an elevator 11, by which the bones are transferred to a vibrating screen 12, whereby the bone fragments are graded. Undersized fragments suitable for the manufacture of meal are discharged by a chute 13. Oversized fragments are discharged by a chute 14 to a conveyor 15, whereby they are returned to a crusher 16 which after reducing their size again feeds them to the hopper 10 of the elevator 11. Those bone fragments fed to the screen 12 which are of correct size for further processing according to the invention are discharged from the screen by a chute 17 into a receptacle 18. From this receptacle, the bone fragments are transferred by suitable means, again for example by mechanical shovels, into a second stage cleaning and degreasing vessel 19 having, as will later be described in detail with reference to FIGURES 4 and 5 a circulating pump 20 and motor and gear box means 21 driving internal agitators. The vessel 19 has a discharge 22 for residual fat and scum separated by flotation, a discharge pipe 23 for a slurry of meat and sinew fragments and any fine bone particles that may have been present, suitable for production of meal, and separated by passage through a transverse perforated plate 24. The vessel further has a discharge branch 25 whereby on completion of the operation as will be described, the finally cleaned and degreased bone fragments of suitable size are discharged to a receptacle 26, from which they are eventually taken for conversion by known methods into gelatine.

A preferred form of apparatus for effecting the final cleaning and degreasing of the bone fragments is shown in FIGURES 2 and 3. This comprises a vessel 31 having a cuboid upper part 32 and a frusto-pyramidal lower part 33. Mainly in the upper part 32, there is mounted for rotation, or for oscillation through a large angle, e.g. 270°–720°, about a horizontal axis, a cylindrical drum 34. The whole or major parts of the cylindrical wall of this drum are apertured, and preferably are made of the well-known wedge wire type of filter plate disposed to control passage from the interior to the exterior of the drum. Included in the cylindrical wall are a plurality of removable apertured sections; as shown there are two pairs of these sections, those of each pair being diametrically opposed and the two pairs being staggered by 90°. These sections when removed permit the feeding of bones into the drum 34 through the top of the vessel 31, which may be open, or may have a cover with suitable removable sections. The drum 34 is mounted on aligned hollow trunnions 37, 38 which are supported respectively in bearings 39, 40, and extend through the vertical walls of the upper part 32 of the vessel 31, by way of glands 41, 42.

Within the trunnion 37 there is disposed a coaxial offtake pipe 43, the inner end of which, within the drum 34, has attached to it a radial extension 44 the ends of which is disposed adjacent the peripheral wall of the drum. The outer end of the pipe 43 is connected by way of a valve 45 to the intake branch 46 of a circulating pump 20, driven by a motor 47. Said intake 46 is also connected by way of a branch valve 48 and a pipe 49 directly to the interior of the vessel 31, for priming purposes. The discharge of the pump is connected by a duct 50, which extends around the vessel, to a return pipe 51 within and coaxial with the trunnion 38 at the other end of the drum. In order to prevent leakage of water from the interior of the drum by way of the hollow trunnions 37 and 38, the latter are provided at their ends respectively with glands 52 and 53 so that said trunnions can freely rotate upon the fixed pipes 43 and 51.

The drum 34 is caused to rotate, or alternatively to oscillate through a large angle, e.g. 240°–720°, by means of a gear wheel 54 engaged by a pinion 55 which is driven by a motor 56 through the intermediary of a suitable form of gear box 57.

The upper part 32 of the vessel is provided with an overflow pipe 58 which serves, or is connected with means which serve to maintain the water level in the vessel at a suitable level, for example as indicated by the chain dot line 59, so that during the operation of the vessel the drum 34 is completely submerged.

The lower, frusto-pyramidal part 33 of the vessel 31 has four branches 60 for the admission of hot water, 61 for the admission of steam, 62 for the discharge of water as and when required and 63 to serve as an outlet for a slurry of meat and bone meal as will be described on completion of the operation. At the bottom of the vessel there is also provided in one of the oblique walls a door 64 which is removable to enable the extraction of treated bones on completion of an operation after the vessel has been drained and said bones have been dumped by removing some or all of the removable portions 35, 36 of the drum and thereafter rotating or oscillating it until it has been emptied.

In the alternative embodiment of a final cleaning and degreasing vessel as shown in FIGURES 4 and 5, which illustrate on a larger scale the vessel 19 shown in FIGURE 1, the bones are charged into the upper part of the vessel 71, which is cylindrical with a frusto-conical intermediate portion 72, the bottom of which is attached with the intervention of a perforated plate 73 to a lower frusto-conical portion 74. An axial vertical shaft 75, which is driven by a motor 76 through a horizontal shaft 77 and a gear box 78, carries adjacent the top of the vessel 19 a single blade 79 extending from the shaft 75 to the wall of the vessel 19, at or near the level of the liquid contents of the vessel 19 as determined by an overflow box 80 having an outlet branch 81. The blade 79 is preferably scimitar-shaped as shown in FIGURE 5, in such relation to its direction of rotation that it serves to sweep fat and scum floating on the surface of the water in the vessel towards the wall of the latter and thereby facilitate its discharge through the box 80 and the branch 81.

Towards the bottom of the upper part of the vessel, as shown, just above the junction of the part 71 and the intermediate frusto-conical part 72, the shaft also carries an agitator 82 having two diametrically opposed arms, the purpose of which is to maintain the liquid and bones contained above the perforated plate 73 in a state of continuous agitation. Further, at its lower end the shaft 75, which penetrates the perforated plate 73, carries a trapezoidal blade agitator 83 which serves to maintain in continuous agitation liquid in the bottom of the vessel and such particles of meat and sinew, and fine particles of bone that may be present, as have passed through the perforated plate 73.

As in the embodiment previously described, the vessel 19 shown in FIGURES 4 and 5 is provided externally with means for continuously and vigorously circulating the water with the bones suspended therein. These means comprise a circulating pump, 20, driven by a motor 47, the intake 84 of the pump being connected by a large duct 85 and a suitable valve 86 to a large outlet branch 87 just above the perforated plate 73. The discharge from the pump 20 is connected to a duct 88 the end 89 of which is connected tangentially to the wall of the upper part 71 of the vessel 19. This vessel is also provided, like that shown in FIGURE 2 with branches corresponding to the branches 60 and 61 for the admission of hot water and steam, and with a branch 90, corresponding to the branch 62, for the discharge of surplus water when necessary. There is also provided at the bottom of the vessel 19 a branch 91, fitted with a suitable valve 92, for the discharge of a slurry of water with meat and sinew particles, and also any fine bone particles present, that have penetrated the perforated plate 73.

FIGURES 6 and 7 show in greater detail the preliminary cleaning and degreasing vessel 6 illustrated in FIGURE 1. This vessel is similar to the vessel 31 illustrated in and described with reference to FIGURES 2 and 3, in that it comprises a cuboid upper part 32a and a frusto-pyramidal lower part 33a, these parts being fitted for the purposes hereinbefore mentioned with branches 58a, 60a, 61a, 62a, and 63a, and the lower part also having a removable door 64a. The vessel also includes a drum 34a rotatable or oscillatable upon a horizontal axis, this drum having its cylindrical wall likewise apertured, and fitted with removable sections 35a, 36a. This drum also may be made of the known wedge wire type of filter plate, disposed to control passage of particles from its interior to its exterior.

The drum in the vessel 6, however, differs from that in the vessel 31 of FIGURE 2, by being mounted on solid trunnions 93, 94, rotatable or oscillatable in gland means 95 comprised in the vertical walls of the upper part 32a, the trunnion 94 having a gear wheel 96 secured thereto, this gear wheel being in mesh with a pinion 97 driven by a motor 98 through a suitable gear box 99.

In carrying out the method of the invention, the roughly crushed raw bones, including oversized fragments and lumps consisting of bone fragments held together by meat and sinew, up to a suitable weight, for example, 3½ tons, are fed into the drum 34a of the vessel 6 through apertures provided by removal of some of the wall portions 35a, 36a. The portions 35a, 36 are replaced. Hot water is then admitted by the branch 60a until the vessel is full to the level of the overflow branch 58a. This water is maintained, with the aid of suitable controls and instruments, at a preferred temperature of 170° F. by steam admitted when required through the branch 61a. The motor 98 is then energised to set the drum in motion, and this is continued for several hours, with the result that at least the greater part of the meat and sinew is removed from the bones, riddled through the apertures in the periphery of the drum, and falls to the bottom of the vessel with any small particles of bone that may be present. At the same time, a large proportion of the fat is freed, rises to the surface of the water, and overflows by way of the branch 58a into a separating vessel or other separating means (not shown).

When the bones are substantially cleaned, and their fat content has been reduced to about 5–6%, a valve attached to the branch 63a is opened, whereby the water is enabled to sweep out a slurry of meat an sinew and fine bone particles from the bottom of the vessel, for treatment in known manner to produce meat and bone meal. Any surplus water is removed by opening the branch 62a.

After the vessel has thus been emptied of slurry and water, some of the sections 35a, 36a of the drum are removed, and the drum is turned until the bones therein are dumped to the bottom of the vessel, and the door 64a is opened to enable their removal.

The bones thus partly cleaned and degreased (or when available, other bones in a similar state) and suitably graded for size, as described with reference to FIG. 1, are fed into a final cleaning and degreasing vessel.

When the latter vessel is as shown in FIGS. 2 and 3, its drum 34 is loaded with bones and the vessel itself is filled with hot water as in the first stage, the water being maintained at a preferred temperature of 170° F. by steam admitted through the branch 61. The motor 56 is then energised to set the drum 34 in motion. Thereafter, the motor 47 is energised to drive the pump 20, suitably primed with water by opening the valve 48 in the pipe 49. The motion of the drum maintains the bones in a state of continuous agitation in the water, and the pump 20 induces the bones, in suspension in the water, from adjacent the periphery of the drum, by way of the branch 44 and pipe 43, and returns the bones and water into the other end of the drum by way of pipes 50 and 51. The rate of circulation is preferably such that the entire volume of water, and with it, all the bones, is circulated in about 1½ minutes. For example, the effective volume of water (except for a substantially stagnant portion at the bottom of the vessel) may be about 1500 gallons, sufficient to contain a batch of partly cleansed and degreased bones of a weight of about 2 tons (i.e. about⅓ of the weight of the water) and the circulation may be at the rate of about 1000 gallons per minute.

This operation, which effects a final cleaning of the bones and reduces their fat content to about 1%, can be carried out in a relatively short period, for example, about 30 minutes. If desired, a small quantity of caustic soda or a detergent may be added to the water.

At the end of the required time, the circulating pump 20 is stopped, and suitable action is taken, with continuance or increase of the hot water flow into the vessel by way of the branch 60, to ensure that all the floating fat has emerged from the overflow branch 58. While the drum 34 is kept in rotation to assist the discharge of small bone fragments from within it, the branch 63 is then opened and a flow of hot water therethrough from the vessel discharges a slurry of meat and sinew particles and fine bone particles, if any, to suitable filtering apparatus. The meal thus obtained together with that obtained from the preceding stage is suitable for treatment in known manner to produce valuable by-products.

After the discharge of said slurry surplus hot water may be run off through the branch 62. Thereafter, the bones held in drum 34 are dumped in the manner above described to the bottom of the vessel, and removed through the door 64. These bones are perfectly clean and polished and suitable for treatment in known manner to produce high grade ossein gelatin. There is no necessity to dry, polish and riddle the bones as has heretofore been required to remove meat and sinew particles, which operation is in any case less effective than the cleaning performed by our invention.

The final cleaning and degreasing vessel illustrated in FIGS. 2 and 3 is a preferable alternative to that illustrated in FIGS. 4 and 5. The apertured drum means for containing the bones within the vessel while under circulation in the hot water is more effective, and the efficiency of the circulation of the bones is thereby enhanced. Moreover, in view of the similarities of construction of the vessels 6 and 31, with their drums 34a and 34 respectively, as illustrated, the manufacture of the apparatus is facilitated and made more economical.

The alternative final cleaning and degreasing vessel illustrated in FIGS. 4 and 5 performs the method of the invention in similar manner. The bones initially in a partly cleaned and degreased state are confined above the perforated plate 73 and kept in vigorous agitation by the blades 82 while being circulated in suspension in the hot water. The pump 20 draws the suspension through the open valve 86 and returns it at high velocity through the pipe 88 to the tangential inlet 89. Fat and scum floats on the water and is swept by the skinner blade 79 to the overflow box 80. Meat and sinew particles, and any fine bone fragments that may be present, pass downwards through the perforated plate 73, and are kept in suspension in the lower part 74 of the vessel by the rotary blade 83. On completion of the operation, in a period of about 30 minutes, the pump 20 is stopped and the slurry of meat, sinew and bone particles is discharged by a flow of hot water through the opened valve 92, facilitated by the agitating means being kept in rotation. Thereafter any remaining water is discharged from the vessel, and the perfectly clean and polished bones, with their fat content reduced to 1% or less, retained on the perforated plate 73, are removed through the door 70.

The method of cleaning and degreasing butchers' bones according to the invention, and apparatus substantially as illustrated and described for the performance of the method, have the advantageous result of producing very clean bones with minimum fat content, which are of a quality fully equal if not superior to the Indian bones which have hitherto been used for the production of high quality ossein gelatin. Moreover, the method and apparatus afford a bone product with the maximum proportion in the form of fragments of the desired size, namely ⅜" to ¾", with a minimum amount in the form of meal or fragments of less than ¼". There is moreover optimum recovery of the meat and sinew particles with such small bone particles as are present or formed in the apparatus, as saleable by-products, and the method and apparatus are highly economical in cost of operation.

What I claim and desire to secure by Letters Patent is:

1. A method of producing cleaned and de-greased bone fragments suitable for the production of ossein gelatin, after preliminary fragmentation to a size range not exceeding about ¾" and not less than about ¼", substantially cleaning from adhering meat and sinew, and reduction of the initial fat content of about 16% to about 5–6%, characterised in that such substantially cleaned and partly de-greased bone fragments are circulated in a closed circuit with a flow of hot water maintained at a temperature of about 140–190° F., from, into and through a large body of said hot water wherein fat is separated by flotation and particles of residual meat and sinew are separated by precipitation from the cleaned and degreased bone fragments.

2. The method according to claim 1, wherein said body of water is agitated and subjected to straining so as to facilitate the separation of meat and sinew particles and of fine bone fragments when present.

3. The method according to claim 1, wherein the lower part of said body of water is agitated and subjected to straining so as to facilitate the separation of meat and sinew particles and of fine bone fragments when present.

4. The method according to claim 1, effected for a period of the order of 30 minutes to effect a thorough cleaning of the bones and reduction of their fat content to the order of not more than 1%.

5. The method according to claim 1 wherein the entire volume of water is circulated in about 1½ minutes.

6. The method according to claim 1, wherein the bones are circulated in approximately three times their weight of water, the entire volume of water being circulated in about 1½ minutes.

7. The method according to claim 1, in combination with a preceding, preliminary cleaning and degreasing effected by confining partly crushed raw bones within the middle of a volume of hot water at a temperature of about 140–190° F., and swirling the bones in the water for a few hours until the greater part of the meat and sinew has been softened and riddled off, and the fat content substantially reduced from an initial 16% by weight to about 5–6%, the meat and sinew particles together with any small bone particles being separated by settling, and the freed fat being separated by flotation.

8. The method comprising the combination of steps claimed in claim 7, wherein the raw bones are roughly crushed and then subjected to said preliminary cleaning and degreasing, whereafter the bones are screened to separate oversize material which is subjected to another crushing stage for reduction to a suitable size range prior to the final cleaning and degreasing step.

9. A method of producing cleaned and degreased bone fragments suitable for the production of ossein gelatine, after preliminary fragmentation to a size range not exceeding about ¾" and not less than about ¼", substantial cleaning from adhering meat and sinew, and reduction of the initial fat content of about 16% to about 5–6%, comprising, in combination, the steps of immersing such substantially cleaned and partly degreased bone fragments in a large body of hot water maintained at a temperature of about 140–190° F., agitating said body of water, and repeatedly and continuously withdrawing some of said bone fragments in a continuous flow of water from said body of water, passing them at high speed through a closed circuit external to said body of water and returning them into said body of water, wherein the fragments move relatively slowly from the point of return to the point of withdrawal so that fat is separated from the bone fragments by flotation and particles of residual meat and sinew are separated from the bone fragments by precipitation, terminating said circulation of water and bone fragments, discharging said body of water and therewith the precipitated meat and sinew while retaining the clean and degreased bone fragments, and withdrawing said bone fragments.

10. Apparatus for the cleaning and degreasing of bone fragments to render them suitable for the production of ossein gelatine comprising a vessel for containing bone fragments reduced to a size range mainly of the order of ¾″–¼″ and having a residual fat content of up to about 6%, means for maintaining a body of water in the vessel at a temperature of about 140° F. to 190° F., means for continuously circulating water and said bone fragments suspended therein from and back into and through said body of water, means for discharge of fat separated by flotation, straining means permitting the settlement in the vessel of residual meat and sinew particles and fine bone particles when present, means for the discharge of a slurry of said settled particles, means for the discharge of the water on completion of the cleaning and degreasing, and means enabling, after discharge of said water and slurry, removal of the cleaned and degreased bone, including an apertured drum for confining the bone fragments, and said drum being rotatable about a horizontal axis, the circulation means serving for circulating the water and suspended bones through said drum.

11. Apparatus according to claim 10, wherein the circulating means draws water and bones suspended therein from adjacent one end of the interior of said drum and returns said water and bones into the other end of the drum.

12. Apparatus according to claim 10, wherein the apertured drum serves as agitating means for the water and bones.

13. Apparatus according to claim 10, wherein said vessel has a downwardly tapered lower portion, a fixed, horizontal, apertured partition separating said lower portion from an upper portion to confine the bone fragments to said upper portion and rotary agitator means adjacent said apertured partition, the circulating means serving to circulate the water and bone fragments suspended therein from above said apertured partition and tangentially back to a higher level of said upper portion of the vessel.

14. Apparatus according to claim 10, wherein the circulating means comprises a pump the intake and delivery ports of which are connected to the interior of the drum by hollow trunnions whereon said drum is rotatable.

15. Apparatus according to claim 14, wherein the pump is connected to said hollow trunnions by ducts external to the vessel.

16. Apparatus for the cleaning and degreasing of bones comprising, in combination with means as claimed in claim 10 a preliminary cleaning and degreasing vessel including an apertured drum adapted to receive roughly crushed raw bones and mounted for rotation about a horizontal axis, means for maintaining water in the vessel at a temperature of about 140–190° F., means for the discharge of fat separated by flotation, means for the discharge of meat and sinew particles and fine bone particles settled in the bottom of the vessel after passage through the apertures in said drum, means for the discharge of water from the vessel after discharge of said particles, means in said drum enabling the dumping of bone fragments from the drum after said discharges, and means at the bottom of said vessel enabling the withdrawal of partially cleaned and degreased fragments therefrom.

17. Apparatus according to claim 16 wherein the drum in said preliminary cleaning and degreasing vessel has longitudinal vanes extending inwardly from its periphery to effect agitation of the bones within the drum.

References Cited in the file of this patent
UNITED STATES PATENTS 2,635,104     Chayen _____ Apr. 14, 1953
2,828,018     Chayen _____ Mar. 25, 1958